United States Patent [19]
Olson et al.

[11] Patent Number: 5,437,837
[45] Date of Patent: * Aug. 1, 1995

[54] CONTROLLED ATMOSPHERE STORAGE CONTAINER

[75] Inventors: Robert J. Olson, Santa Rosa; Max D. Liston, Irvine; Todd I. Harrison, Santa Ana, all of Calif.

[73] Assignee: Prolong Systems, Inc., Wilsonville, Oreg.

[*] Notice: The portion of the term of this patent subsequent to Jul. 26, 2011 has been disclaimed.

[21] Appl. No.: 193,799

[22] Filed: Feb. 8, 1994

Related U.S. Application Data

[63] Continuation of Ser. No. 968,829, Oct. 29, 1992, Pat. No. 5,332,547, which is a continuation of Ser. No. 686,174, Apr. 16, 1991, abandoned.

[51] Int. Cl.⁶ ............ G05B 15/00; A61L 9/00; B01J 19/00; A01K 43/00
[52] U.S. Cl. ............................................. 422/3
[58] Field of Search ............ 422/3, 4, 5, 25, 40, 422/108, 110, 120, 305, 83, 112, 255; 62/78, 93, 17; 73/1 G, 23.3, 19.01; 426/231, 418, 419

[56] References Cited

U.S. PATENT DOCUMENTS

| | | | |
|---|---|---|---|
| 1,819,643 | 8/1931 | Fleisher . | |
| 2,617,275 | 11/1952 | Goff et al. | 62/175.5 |
| 3,102,777 | 9/1963 | Bedrosian et al. | 21/58 |
| 3,163,022 | 12/1964 | Hottenroth | 62/168 |
| 3,360,380 | 12/1967 | Bedrosian | 99/154 |
| 3,445,194 | 5/1969 | Thomas et al. | 23/281 |
| 3,508,881 | 4/1970 | Hagenauer et al. | 23/281 |
| 3,536,370 | 10/1970 | Evans et al. | 312/1 |
| 3,547,576 | 12/1970 | Sheikh | 21/53 |
| 4,212,891 | 7/1980 | Fujita et al. | 426/231 |
| 4,228,197 | 10/1980 | Means | 426/419 |
| 4,716,739 | 1/1988 | Harris et al. | 62/78 |
| 4,754,611 | 7/1988 | Hosaka et al. | 62/78 |
| 4,779,446 | 10/1988 | Rowland | 73/1 |
| 4,817,391 | 4/1989 | Roe et al. | 62/17 |
| 4,829,774 | 5/1989 | Wassibauer et al. | 62/78 |
| 4,833,892 | 5/1989 | Wassibauer et al. | 62/78 |
| 4,841,732 | 6/1989 | Sarcia | 62/36 |
| 4,880,441 | 11/1989 | Kesting et al. | 55/16 |
| 4,961,322 | 10/1990 | Oguma et al. | 62/179 |
| 4,976,109 | 12/1990 | Garrett | 62/18 |
| 5,063,753 | 11/1991 | Woodruff | 62/239 |

FOREIGN PATENT DOCUMENTS

| | | |
|---|---|---|
| 28492 | 8/1930 | Australia . |
| 2849230 | 8/1930 | United Kingdom . |
| 0358359 | 3/1990 | United Kingdom . |

OTHER PUBLICATIONS

Airplay—Apr. 1991—"Technical", p. 39.

*Primary Examiner*—Robert J. Warden
*Assistant Examiner*—Christopher Y. Kim
*Attorney, Agent, or Firm*—Stetina Brunda & Buyan

[57] ABSTRACT

The present invention is a device for maintaining a controlled atmosphere within a sealed container. The device is utilized to control the oxygen and the carbon dioxide levels within the container and utilizes permeable membrane technology to control such levels. An oilless compressor is used in conjunction with the device so as to not subject the permeable membranes to the derogatory effects associated with the presence of oil within an airstream that circulates through the permeable membranes. Additionally, the compressor is preferably mounted within the sealed container so as to not subject the compressor to the effects of temperature variation and corrosive marine environments. The present device further includes an air sampling system which is used to periodically measure the oxygen and carbon dioxide levels within the container. Control logic is included with the system which is operable to adjust the oxygen and carbon dioxide levels in accordance with the particular readings obtained by the sampling system.

19 Claims, 4 Drawing Sheets

Fig. 3b

CONTROLLED ATMOSPHERE STORAGE CONTAINER

This application is a continuation of application Ser. No. 07/968,829, filed Oct. 29, 1992 now U.S. Pat. No. 5,332,547 which is a continuation of Ser. No. 07/086,174 filed Apr. 16, 1991, now abandoned.

FIELD OF THE INVENTION

The present invention relates generally to the production of controlled atmosphere environments, and more particularly to a device used for the control of oxygen and carbon dioxide levels within shipping containers used for the transportation of perishable foods, such as fruits, produce, or grain.

BACKGROUND OF THE INVENTION

The broad concept of utilizing controlled environments to promote storage life of perishable commodities such as fruits and grains is well known. Though the use of refrigeration units has been a common technique of preserving perishable goods, certain types of controlled atmosphere systems are currently known which operate through the controlled manipulation of carbon dioxide and oxygen levels within transport/shipping containers in addition to the use of refrigeration. In this respect, hollow fiber permeable membranes are often used for air separation in maintaining controlled carbon dioxide and oxygen levels within grain elevators and controlled atmosphere warehouses. As with most controlled atmosphere systems, those utilizing permeable membranes require a reliable source of compressed air.

Recent advances in membrane technology have increased the efficiency and decreased the size of gas-permeable membrane systems thereby making the application of membrane technology more feasible for controlled atmosphere transport applications. However, though the technology associated with permeable membranes has advanced, transport refrigeration units typically do not include controlled atmosphere devices because of the reduced cargo space, increased weight, power and cost. Additionally, the corrosive marine environments and extreme temperature parameters typically encountered by mobile containers makes controlled atmosphere applications in conjunction with such containers very difficult since the compressor used to supply compressed air to such controlled atmosphere system oftentimes disfunctions when subjected to such conditions.

A device for producing a controlled atmosphere which utilizes permeable membranes is disclosed in U.S. Pat. No. 4,187,391 to ROE. The ROE reference discloses a method and apparatus for producing a controlled atmosphere within a stationary storage container, such as a grain elevator or produce warehouse, wherein air from the interior of the controlled atmosphere warehouse is recirculated via a membrane system to reduce its oxygen and carbon dioxide content. The ROE system however, due to a recirculation of air within the interior of the container, creates a vacuum within the container and thus appears to promote leakage of ambient air into the interior of the container. Additionally, the ROE patent utilizes a compressor located exterior of the controlled environment container as well as a conventional air cleaner to eliminate oil and/or other contaminants from the controlled air stream.

Most controlled atmosphere systems, including that as disclosed in the ROE reference, utilize oil-flooded rotary screw or rotary vane air compressors which are typically mounted to the exterior of the transport container. However, controlled atmosphere systems incorporating exteriorally mounted, oil-flooded compressors possess certain inherent deficiencies which detract from their overall utility. One such deficiency which pertains to permeable membrane-controlled atmosphere systems relates to oil carryover. Since trace amounts of oil eventually reduce membrane performance, it is critical that oil be prevented from entering the permeable membranes. However, all oil-type compressors pass small amounts of oil into the compressed air and therefore into the membranes. Though many of these systems are provided with oil filters, removing all trace amounts of oil by replaceable filters is very difficult and hence reduction in system performance results. Thus, in the actual operating environment, the filters are typically not changed on the regular intervals necessary to assure adequate performance and oil removal.

A second deficiency relates to temperature variation. As can be appreciated, ocean shipping containers travel all over the world and therefore encounter typical operating temperature parameters between minus 50-degrees Fahrenheit to 130-degrees Fahrenheit. Most standard air compressors used in conjunction with controlled atmosphere systems have temperature operating parameters of 32-degrees Fahrenheit to 110-degrees Fahrenheit without special changes to the compressor itself or to the oil with which it is utilized. Since the compressor may see extreme temperatures on opposite ends of the temperature scale during a single voyage, the compressor must be adapted to operate continuously throughout the temperature range without oil changes or other servicing.

A further deficiency relates to corrosion. In this regard, any compressor mounted on the exterior of the ocean container will be exposed to salt water corrosion, rain, sleet and snow. Thus, in configurations such as that previously discussed with respect to the ROE reference wherein the compressor is mounted to the exterior of the container, the compressor would necessarily be subject to the aforementioned conditions. The present invention specifically overcomes these and other deficiencies associated with prior art controlled atmosphere systems.

SUMMARY OF THE INVENTION

In accordance with the preferred embodiment of the present invention there is provided a device for maintaining a controlled atmosphere within a sealed container. The device generally comprises a first inlet which is adapted to receive ambient air from outside the container. Attached to the first inlet is an oilless compressor having an intake port connected to the first inlet and an exhaust port. In the preferred embodiment, the compressor is specifically adapted to be disposed within the interior of the container so as not to be subject to deragatory environmental conditions. Disposed outside of the container is a gas separation means which has an entrance port connected to the compressor exhaust port and an exit port. A first outlet is connected to the exit port of the gas separation means for placing the exit port in fluid communication with the processed air inside the container. The gas separation means preferably incorporates permeable membranes which are used to obtain predetermined oxygen, and nitrogen levels within the container. During operation of the device, the air compressor is operable to pressurize the interior of the container.

The device furthers comprises a second outlet for receiving processed air from within the container. In the preferred embodiment, the second outlet is connected to a gas analyzing means which is operable to determine the oxygen and carbon dioxide levels of processed air existing within the container. Additionally, a control means is electrically interfaced to the gas analyzer means which is operable to increase or decrease the oxygen and/or carbon dioxide levels within the container in response to signals generated by the gas analyzing means.

Also connected to the second outlet is an air calibration means and a gas calibration means. When activated, the air calibration means is used to calibrate the gas analyzer by passing ambient air through the gas analyzer. Similarly, the gas calibration means, when activated, is used to calibrate the gas analyzer by passing a predetermined amount of calibrating gas through the gas analyzer.

It is an object of the present invention to provide a device for maintaining a controlled atmosphere within a sealed container which utilizes an oilless compressor disposed within the container so as not to-be subject to deragatory environmental conditions.

Another object of the present invention is to provide a device for maintaining a controlled atmosphere within a sealed container wherein the device includes means for taking samples of air within the container to determine oxygen and carbon dioxide content.

Another object of the present invention is to provide a device for maintaining a controlled atmosphere within a sealed container wherein the oxygen levels and carbon dioxide levels within the container may be increased and/or decreased in response to a determination that such levels are too high and/or too low.

BRIEF DESCRIPTION OF THE DRAWINGS

These as well as other features of the present invention will become apparent upon reference to the drawings wherein.

DETAILED DESCRIPTION OF THE PREFERRED EMBODIMENT

Figure 1:
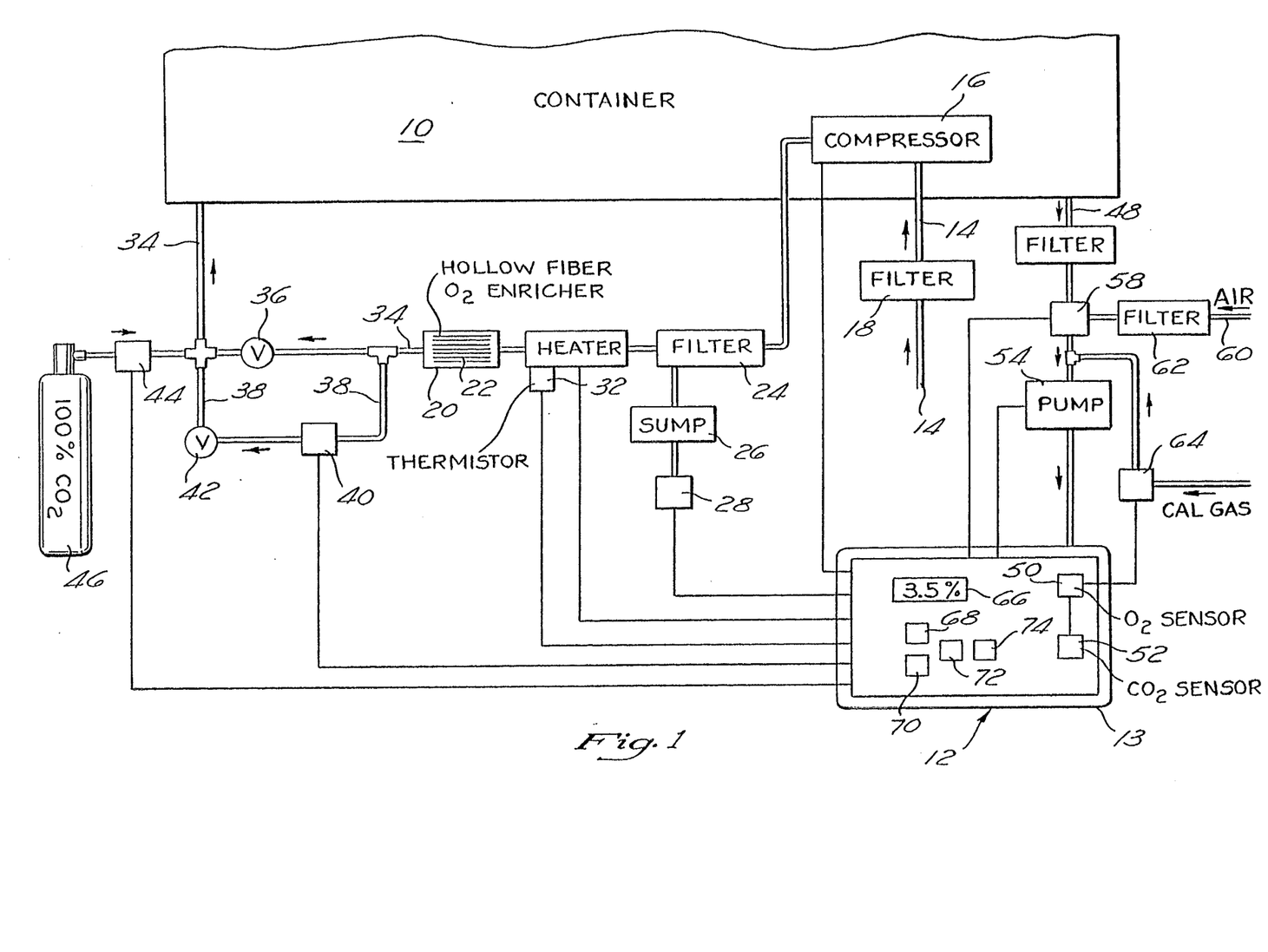
FIG. 1 is a schematic piping and control diagram of the present invention.

Referring now to the drawings wherein the showings are for purposes of illustrating a preferred embodiment of the present invention only, and not for purposes of limiting the same, FIG. 1 schematically illustrates the system for maintaining a controlled atmosphere within a closed container 10. In the preferred embodiment, container 10 is constructed in a manner so as to be airtight. The system as interfaced to container 10 comprises two independent air flow paths. The first path is adapted to draw air from outside the container 10 and, after processing of the same, subsequently introduce such air into the container 10. The second path is adapted to draw a quantity of the processed air from inside the container 10 for sampling purposes. Importantly, each of the two flow paths comprise components which are electrically interfaced to a controller 12 which is adapted to selectively activate and deactivate each of the two flow paths and to coordinate their operation.

AIR INLET SYSTEM STRUCTURE AND OPERATION

As depicted in the figures the air flow path of the present invention which draws air from outside of the container 10 and subsequently introduces such air into container 10 generally comprises a first inlet 14 which is adapted to receive ambient air from outside of container 10. Disposed within container 10 is an air compressor which is electrically interfaced to controller 12 and includes an intake port connected to first inlet 14 and an exhaust port. When controller 12 activates compressor air is drawn into first inlet 14. Positioned between first inlet 14 and compressor 16 is a first filter 18 which is operable to remove salt mist or other particulates from the air drawn into first inlet 14 before such air enters air compressor 16. Air drawn into air compressor 16 through its intake port is compressed to a typical value of approximately 100 psi.

In the preferred embodiment of the present invention, compressor 16 is an oilless air compressor. Importantly, since compressor 16 contains no oil, the problems associated with oil carryover as previously indicated are totally eliminated. To eliminate the need for oil, compressor 16 utilizes Teflon rings and piston skirts for lubrication. Additionally, all bearings within the compressor 16 are permanently greased and sealed. By mounting the compressor 16 within the container 10, a number of the other previously-specified environmentally related problems are also eliminated. One such problem pertains to temperature variations to which compressors used in conjunction with prior art controlled atmosphere systems are typically exposed. Since the compressor 16 of the present invention is mounted within the container 10, the temperature variations to which it is exposed will generally be only $+/-1$ degree Fahrenheit of a particular temperature set point. Thus, the compressor 16 need not undergo any specialized modifications to accommodate wide temperature range variations. The oilless compressor 16 also operates at a much cooler temperature when mounted inside the container 10 which results in much longer life expectancy. Additionally, by mounting the compressor 16 inside the container 10, the compressor 16 is isolated from corrosive marine environment, rain, sleet, or snow.

After the air is compressed by the compressor 16, the air is communicated back outside of the container 10 and into a gas separation means 20 which includes an entrance port connected to the exhaust port of compressor 16, and an exit port. In the preferred embodiment of the present invention, gas separation means 20 comprises a hollow fiber oxygen enricher which includes a plurality of hollow fiber permeable membranes 22 disposed therein. Importantly, when compressed air enters the bores of the hollow fiber permeable membranes 22, fast traveling gases such as oxygen and carbon dioxide as well as water are able to permeate through the walls of the membranes 22 at a faster rate than slower traveling gases such as nitrogen. Thus, as will be recognized, the rate at which air passes through the membranes 22 determines the volume and purity of the nitrogen which is produced by and exits through the exit port of the gas separation means 20. The permeable membranes 22 preferably utilized in conjunction with the present invention are manufactured by Permea, Inc. and are more thoroughly disclosed in U.S. Pat. No. 4,880,441, the disclosure of which is expressly incorporated herein by reference.

Disposed between air compressor 16 and gas separation means 20 is a second filter 24. Second filter 24 is used to purify the air exhausting from compressor 16 to 3.0 microns and to remove water vapor therefrom. Connected to second filter 24 is a sump 26 which is used to collect water removed from the compressed air by second filter 24. Additionally, connected to sump 26 is a first solenoid valve 28 which is electrically interfaced to controller 12. First solenoid valve 28 is interfaced to a drain (not shown) disposed within sump 26 and is periodically activated by controller 12 to drain water which has accumulated within sump 26. Disposed between the second filter 24 and gas separation means 20 is a heater 30 which is also electrically interfaced to controller 12. Heater 30 is operable to heat the compressed air to a temperature set point of approximately 50 degrees Celsius before such air enters gas separation means 20. Attached to the heater 30 is a thermistor 32 which is also electrically interfaced to controller 12 and operable to sense the air temperature and send an air temperature signal to the controller 12. Thus, through the utilization of the oilless air compressor 16, second filter 24, and heater 30, the air entering gas separation means 20 is pre-heated and free of oil, particles, and condensed water. Since any presence of oil and/or water within the compressed air will have detrimental effects on the permeable membranes 22 disposed within the gas separation means 20, the utilization of an oilless compressor 16 in conjunction with the aforementioned configuration prevents such derogatory effects from occurring. Though not shown, a regulator valve may be placed between the second filter 24 and the heater 30. This regulator valve is operable to prevent the compressed air pressure from exceeding the maximum rating of air compressor 16. In this respect, a high pressure safety relief valve set at a predetermined pressure may also be included to prevent an over-pressure situation from occurring. A high temperature switch may also be provided to prevent the heater 30 from heating the air beyond the 50-degree Celsius temperature in the event the thermistor 32 fails.

Connected to the exit port of the gas separation means 20 is a first outlet 34. First outlet 34 is used to place the exit port of gas separation means 20 in fluid communication with processed air inside container 10. Connected to first outlet 34 is a first valve 36 which is used to regulate the flow of air through gas separation means 20. Also connected to first outlet 34 is a bypass channel 38 incorporating a second solenoid valve 40 which is electrically interfaced to controller 12, and a restricting orifice 42. As seen in FIG. 1, bypass channel 38 is interfaced to first outlet 34 in a manner whereby bypass channel 38 is operable to form a flow path between gas separation means 20 and container 10 which does not include first valve 36. As such, when second solenoid valve 40 is not activated, gas which exits gas separation means 20 and flows into first outlet 34, flows only through first valve 36 before entering container 10. When second solenoid valve 40 is activated, gas exiting gas separation means 20 flows through two separate flow paths. The first is the same as previously described wherein the gas enters first outlet 34 and flows through first valve 36 before entering container 10. In the second path, after gas enters first outlet 34, the gas flows into bypass channel 38, through restricting orifice 42, and back into first outlet 34 before entering container 10. As can be appreciated, when second solenoid valve 40 is activated, the flow of air through gas separation means 20 is increased. In contrast, when second solenoid valve 40 is not activated, the flow of air through gas separation means 20 will be relatively slow since all the air channeled into first outlet 34 must pass through first valve 36. In those instances when the flow rate of air through air separation means 20 is slow, greater amounts of oxygen and carbon dioxide are allowed to permeate through permeable membranes 22, thereby causing a gas which is very low in oxygen and carbon dioxide content to be introduced into container 10 via first outlet 34. When second solenoid valve 40 is opened, the flow rate of air through gas separation means 20 significantly increases, since in addition to traveling through first valve 36, gas exiting air separation means 20 also travels through bypass channel 38, and restricting orifice 42. As such, the increased flow rate through gas separation means 20 causes less oxygen to be removed from the air, thereby causing gas having increased oxygen levels to be introduced into container 10. Thus, by manipulating the first valve 36 and the solenoid valve 40 in a desired manner, two different flow rates through gas separation means 20 may be achieved, thereby allowing gas having increased or decreased concentrations of oxygen to be introduced into the container 10.

Also connected to first outlet 34 is a third solenoid valve 44 which is electrically-interfaced to controller 12. Connected to third solenoid valve 44 is a tank 46 containing pure carbon dioxide. When third solenoid valve 44 is actuated by the controller 12, pure carbon dioxide is allowed to pass from tank 46 into first outlet 34 and subsequently into container 10.

AIR SAMPLING SYSTEM STRUCTURE AND OPERATION

The second air flow path of the present invention consists of an air sampling system which is used to periodically monitor the oxygen and carbon dioxide levels of gas within container 10. Connected to container 10 is a second outlet 48 which is adapted to receive gas from within container 10. Second outlet 48 is connected to controller 12, and more particularly to an oxygen sensor 50 and a carbon dioxide sensor 52 which are interfaced to the controller 12. Positioned within second outlet 48 between container 10 and controller 12 is a pump 54 which is electrically interfaced to controller 12. When activated, pump 54 is operable to create a vacuum, thereby drawing gas from within container 10 into second outlet 48 and hence oxygen sensor 50 and carbon dioxide sensor 52. Also positioned within second outlet 48 between container 10 and pump 54 is a third filter 56. Third filter 58 is operable to filter any contaminants from the gas drawn into second outlet 48 from within container 10 before such gas is exposed to the oxygen sensor 50 and the carbon dioxide sensor 52. In the preferred embodiment, pump 54 is activated by the controller 12 so as to provide samplings of the oxygen and carbon dioxide levels within the container 10.

CALIBRATION PROCEDURES

In the present invention, both the oxygen sensor 50 and carbon dioxide sensor 52 require periodic calibration. In the preferred embodiment, two types of calibration methods are utilized, i.e. an air calibration method and a gas calibration method. With respect to the air calibration method, disposed within second outlet 48 between pump 54 and filter 56 is a fourth solenoid valve 58 which is electrically interfaced to controller 12. Connected to fourth solenoid valve 58 is a second air inlet 60 which is adapted to receive air from outside of container 10. Additionally, disposed within second air inlet 60 is a fourth filter 62 which is operable to filter any contaminants from the air entering second air inlet 60 before such air is able to pass through fourth solenoid valve 58 and into second outlet 48. The air calibration procedure is performed automatically by the controller 12, and in the preferred embodiment occurs once per hour. During the air calibration procedure, the controller 12 opens fourth solenoid valve 58 and activates pump 54 which draws air through second inlet 60. After allowing time for the oxygen sensor 50 and the carbon dioxide sensor 52 to be purged with outside air, the controller assumes the readings to be 0.1 percent carbon dioxide and 20.8 percent oxygen. These readings are used as base line settings for the next hour. Importantly, the assumed carbon dioxide and oxygen levels coincide with the oxygen and carbon dioxide levels typically found in ambient air.

Referring now to the gas calibration system, connected to second outlet 48 between fourth solenoid valve 58 and pump 54 is a fifth solenoid valve 64 which is electrically interfaced to controller 12 and connected to a source of calibrating gas (not shown). The gas calibration procedure is performed only by manual request after an operator has connected a tank of calibrating gas to the fifth solenoid valve 64. In the preferred embodiment, the calibrating gas contains 5 percent carbon dioxide and 95 percent nitrogen. When a gas calibration procedure is conducted, the controller 12 opens the fifth solenoid valve 64 and allows the oxygen sensor 50 and the carbon dioxide sensor 52 to be purged with the calibrating gas. After allowing time for this purging procedure to occur, the controller assumes the readings to be 5 percent carbon dioxide and 0.0 percent oxygen. These readings are used as a gain setting until the next gas calibration procedure is conducted. Importantly, if the controller 12 detects no difference between the gas calibration and the previous air calibration, it assumes that no calibration gas was made available and continues to use the previous gas calibration values. This particular occurrence will also cause an error message to be produced.

The air calibration procedure can also be manually requested when desired. Performing a manual air calibration procedure resets the time to the next automatic air calibration procedure to one hour. Additionally, during any air calibration procedure the sump 26 is drained by the first solenoid valve 28 for ten seconds. When the controller 12 is powered up without a valid gas calibration in its battery-backed memory, it cannot display valid oxygen and carbon dioxide values. In this case, a gas calibration is needed before normal operation is possible.

The source of the calibrating gas used for the gas calibration procedure is preferably a portable tank of gas which includes a pressure-regulator and a flow restrictor attached thereto. The fifth solenoid valve 64 preferably includes a quick connect fitting that seals the tank side of the connection when separated.

CONTROLLER STRUCTURE AND OPERATION

In the preferred embodiment of the present invention, the controller 12 preferably comprises a housing 13 having a microprocessor (not shown) disposed therein. The oxygen sensor 50 and carbon dioxide sensor 52 are disposed within the housing 13 and electrically interfaced to the microprocessor. Additionally, the following previously-described components are electrically interfaced to the microprocessor: air compressor 16; first solenoid valve 28; heater 30; thermistor 32; second solenoid valve 40; third solenoid valve 44; fourth solenoid valve 58; and fifth solenoid valve 64. Included within the housing 13 of controller 12 is a display panel 66 as well as four function control buttons. More particularly, these buttons are an "UP" button 68, a "DOWN" button 70, a "SET" button 72, and a "FUNCTION" button 74. The UP button 68 and the DOWN button 70 are used to adjust values or trigger events which are displayed on display panel 66 through the use of the SET button 72 and the FUNCTION button 74. The SET button 72 scrolls through choices that let the user set the following list of values:

| ITEM | RANGE | DEFAULT |
|---|---|---|
| Temperature | (40–60° C.) | 50° C. |
| Oxygen Set Point | (0.0–20.0%) | 5.0% Oxygen |
| Oxygen Hysteresis | (0.1–1.0%) | 1.0% Oxygen |
| Carbon Dioxide Set Point | (0.0–20.0%) | 5.0% Carbon Dioxide |
| Carbon Dioxide Hysteresis | (0.1–1.0%) | 1.0% Carbon Dioxide |

The FUNCTION button 74 scrolls through choices that let the user manually initiate an air or gas calibration cycle. The user can also display on display panel 66 the total compressor on time, and by using a combination of the aforementioned buttons clear the total time. The total compressor on time is displayed on display panel 66 in hours with the maximum value being 4660 hours. If the maximum is exceeded, the count changes to the word "OVERFLOW" on the display panel 66 until the count is cleared back to zero.

CONTROL LOGIC AND SYSTEM OPERATION

Figure 2:
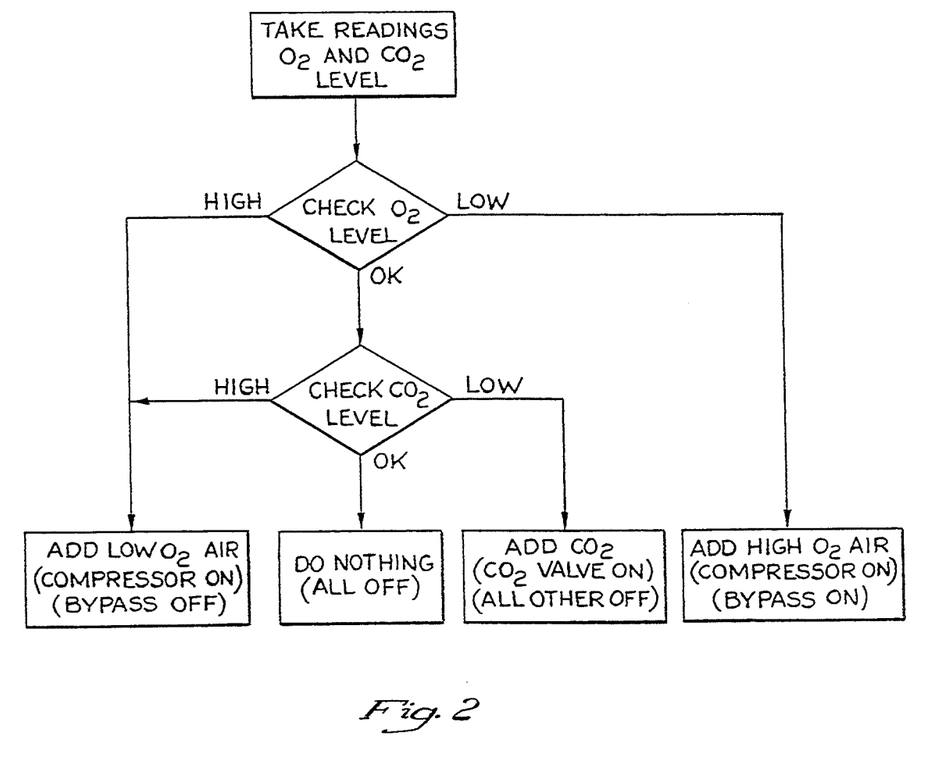
FIG. 2 is a flow chart of a first embodiment of the control logic of the present invention.

Referring now to FIG. 2, illustrated is a flow chart which provides the general control logic according to which the system of the present invention functions. In the following discussion, the procedure specified in FIG. 2 will be explained in conjunction with the system shown in FIG. 1 to fully and completely describe the operation of the present invention.

In accordance with the present invention, the oxygen level within container 10 is typically maintained at a level of 2 to 5 percent while the carbon dioxide level is typically maintained at a level of 1 to 10 percent depending on the type of produce being stored within container 10. The remainder of the air within the container 10 preferably comprises nitrogen. Importantly, through the operation of compressor 16 the gas within container 10 is maintained at a moderate pressurized state relative ambient pressure. As can be appreciated, by maintaining such gas in a pressurized state, ambient air from outside container 10 is not able to leak into container 10. Rather, any leakage would only involve gas from within container 10 leaking to the outside of container 10. In the initial phases of operation, the oxygen sensor 50 and the carbon dioxide sensor 52 are calibrated using an air calibration procedure and a gas calibration procedure conducted in a manner as previously described. As also previously indicated, these calibration values are stored within the microprocessor of controller 12.

During operation of the present invention, the microprocessor within controller 12 activates pump 54 thereby drawing air into second outlet 48 and through oxygen sensor 50 and carbon dioxide sensor 52. Approximately every 2 seconds, readings of the oxygen and carbon dioxide levels within container 10 are taken by the sensors 50 and 52. The controller 12 first senses the oxygen levels and then senses the carbon dioxide levels and determines whether such levels are too low or too high relative desired oxygen and carbon dioxide level set points or bands. The oxygen and carbon dioxide set point levels are typically 2 percent and 5 percent, respectively, as inputted into the microprocessor by the function control buttons, though it will be appreciated that other oxygen and carbon dioxide set points may be programmed into the microprocessor as different commodities have different requirements. Additionally, as previously specified the acceptable oxygen and carbon dioxide bands are typically 2 to 5 percent and 1 to 10 percent, respectively.

Oxygen Level High

In response to a determination by the oxygen sensor 50 that the oxygen level within container 10 is too high, i.e. exceeding the 2 percent set point or not within the acceptable band, the microprocessor within controller 12 will respond by switching on the air compressor 16, heater 30, and thermistor 32. Controller 12 will also maintain second solenoid valve 40 in the OFF position. Due to the activation of air compressor 16, air will be drawn from outside of container 10 into first inlet 14, and will subsequently pass into gas separation means 20. Since second solenoid valve 40 is not activated, gas exiting gas separation means 20 into first outlet 34 will pass only through first valve 36 before entering container 10. For the reasons as previously discussed, this particular flow path causes reduced flow through gas separation means 20 thereby permitting greater quantities of oxygen to be removed from the air passing through permeable membranes 22. As such, gas entering container 10 through first outlet 34 has a greatly reduced oxygen level which therefor reduces the oxygen content within container 10.

Oxygen Level Low

In response to a determination from the oxygen sensor 50 that the oxygen level within container 10 is too low, i.e. less than 2 percent, the microprocessor within the controller 12 will once again actuate Operation of the air compressor 16 and will likewise activate the heater 30 and thermistor 32. Additionally, the controller 12 will also turn the second solenoid valve 40 to the ON position. Once activated, air compressor 16 will draw air into first inlet 14 and channel such air into gas separation means 20. However, since second solenoid valve 40 is now activated, gas exiting gas separation means 20 into first outlet 34 will pass through restricting orifice 42 in addition to first valve 36. Thus, as previously discussed and described, through the activation of second solenoid valve 40, the air flow through gas separation means 20 will be greatly increased. Due to this increased flow, less oxygen will be removed from the air by permeable membranes 22. Thus, the oxygen content of gas entering container 10 via first outlet 34 is increased, thereby increasing the oxygen levels within container 10.

Carbon Dioxide Level High in response to a determination from the carbon dioxide sensor 52 that the carbon dioxide level within container 10 is too high, i.e. exceeding 5 percent or not within the acceptable band, the system will function in exactly the same manner as previously discussed with respect to the determination that the oxygen level within container 10 is too high.

Carbon Dioxide Level Low

In response to a determination from the carbon dioxide sensor 52 that the carbon dioxide level within the container 10 is too low, i.e. less than 5 percent, the microprocessor within the controller 12 will cause the third solenoid valve 44 to actuate which allows pure carbon dioxide to pass from the tank 46 through first outlet 34 and into container 10, thereby raising the carbon dioxide levels within container 10.

If a determination is made by the oxygen sensor 50 and the carbon dioxide sensor 52 that the oxygen and carbon dioxide levels within container 10 are within the desired parameters, the controller 12 does not activate the air compressor 16 nor is the third solenoid valve 44 activated. Every hour of system operation, the controller 12 will activate fourth solenoid valve 58 and pump 54 thereby preventing air from entering controller 12 from container 10 but allowing air to enter thereinto through second inlet 60. When such occurs, the air calibration procedure is automatically conducted in the manner as previously described. The calibrated air is assumed to have 500 ppm carbon dioxide and 20.8% oxygen. Since the carbon dioxide sensor 52 has a stable span when the first zero point is maintained and the oxygen sensor 50 has a stable zero setting, this method is very effective in maintaining the sensors 52 and 50 in calibration for long periods. Once again, the controller 12 can be utilized to actuate the fifth solenoid valve 64 to conduct a gas calibration procedure if desired. The solenoid valve 64 provides a zero for the oxygen sensor 50 and a span calibration for the carbon dioxide sensor 52. Additionally, valve 64 is employed at low frequency to calibrate or verify proper operation of the sensors 50 and 52. It should be noted that the controller 12 cannot control the system while being calibrated. In this respect, the compressor 16 (if running) will stop when any of the function buttons is pushed, and due to the minimum off time requirement, the controller 12 will wait approximately three minutes before resuming control.

The control logic of the present invention is shown in FIG. 2. In this respect, the microprocessor is programmed with a time-based lock-out that prevents the compressor 16 from being "short cycled". Thus the compressor 16 will always be kept off for a minimum time of three minutes, even if the control logic attempts to cause compressor activation to occur. Additionally, the temperature control facilitated by thermistor 32 is interlocked with the control of compressor 16. Thus, no heating of the air will take place when the compressor 16 is not operating. It is also contemplated that hardware circuitry may be utilized in conjunction with the present system that will detect a failed temperature sensor. If this condition occurs, the heater 30 will run at a fixed duty cycle in an attempt to maintain a useful system temperature. It is also contemplated that an interlock may be programmed within the microprocessor so that the compressor 16 will not run until the temperature is within the control range. This would prevent any cold air from being sent to the permeable membranes 22 within gas separation means 20. An additional interlock is also added to prevent the controlled atmosphere system of the present invention from operating until the refrigeration system has brought the container 10 to the modified temperature operation. This prevents the present system from adding to the peak electrical power load. Such prevention is important since many mobile installations have limited electrical power available.

Figure 3A:
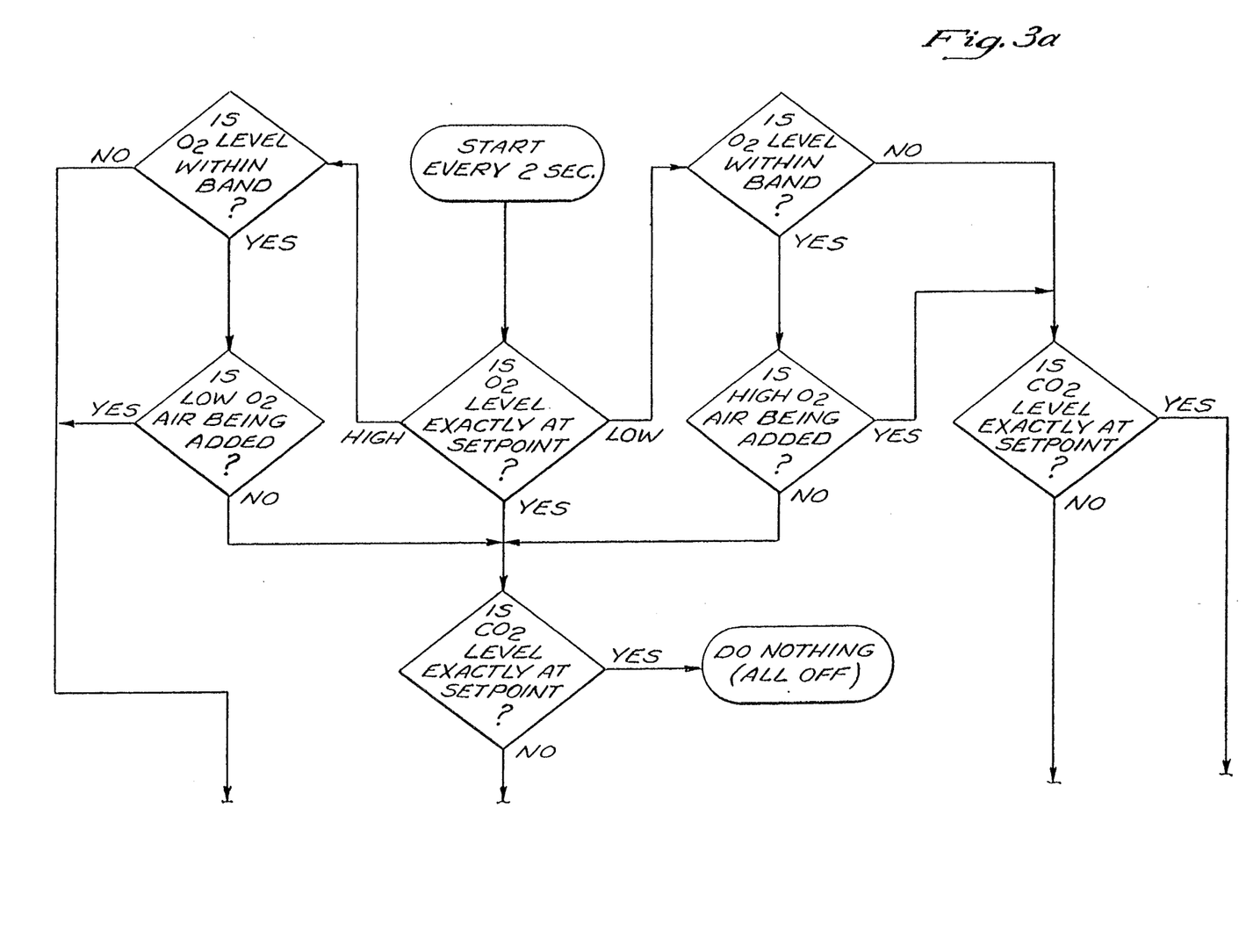
FIGS. 3a and 3b are a flow chart of a second embodiment of the control logic of the present invention.
Figure 3B:
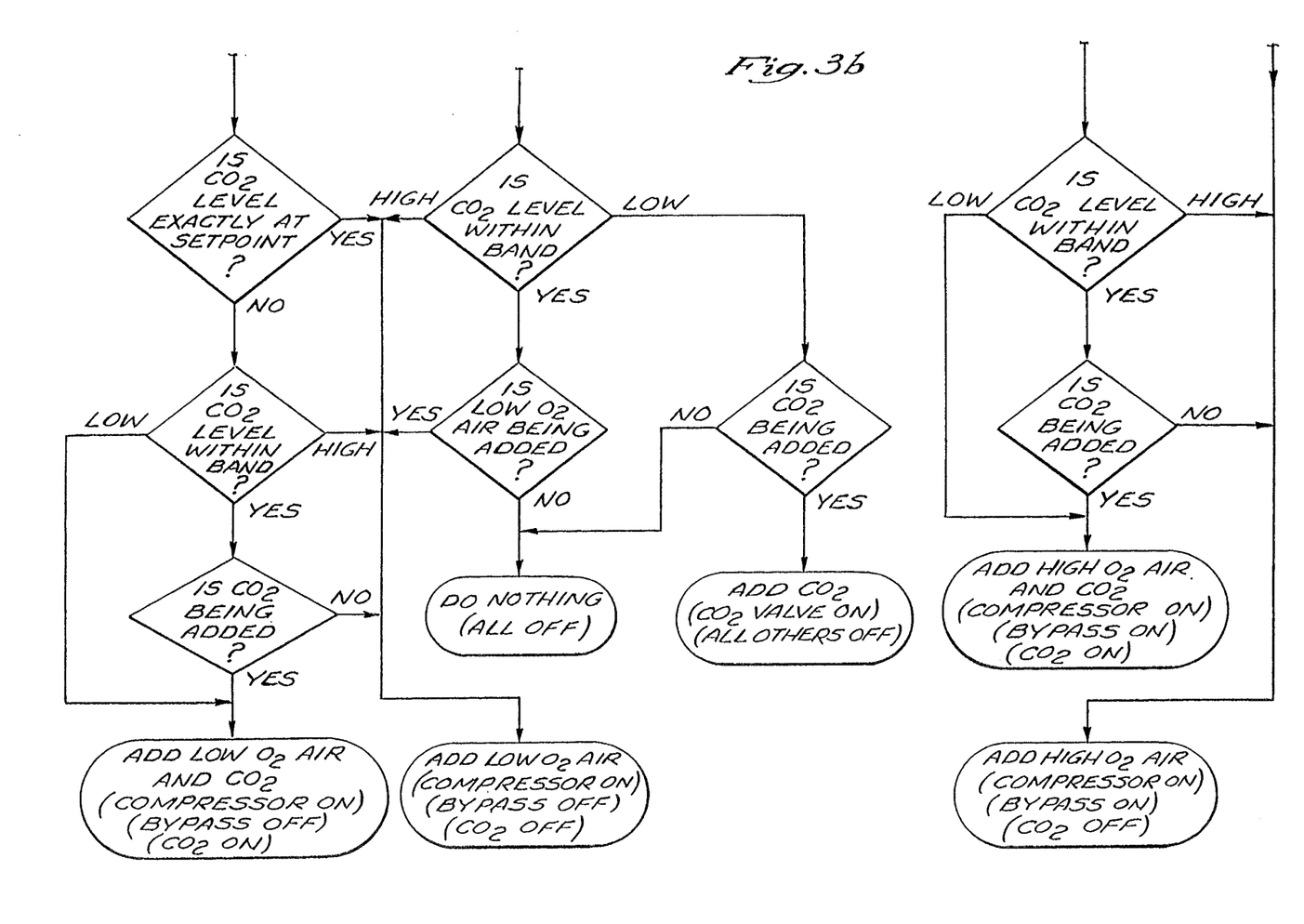

Referring now to FIGS. 3a and 3b, illustrated is a flow chart which shows a second embodiment of the control logic of the present invention. As can be seen from the flow chart, in certain circumstances carbon dioxide is added to the gas within container 10 concurrently with low oxygen air or high oxygen air. This differs from the first embodiment wherein the addition of carbon dioxide to gas within container 10 was only conducted independently. To facilitate the simultaneous input of carbon dioxide and air having low or high oxygen levels into container 10, the controller 12 and sensors 50 and 52 functioning in accordance with the control logic of the second embodiment will make determinations including whether the oxygen and carbon dioxide levels are at the inputted set points, whether the oxygen and carbon dioxide levels are within the acceptable bands, and whether high oxygen air, low oxygen air, or carbon dioxide are being added to the system. As previously specified, the oxygen set point is typically two percent with an acceptable band of two to five percent and the carbon dioxide set point is typically five percent with an acceptable band of one to ten percent. It will be recognized that to simultaneously input carbon dioxide and low oxygen air into container 10, compressor 16 and third solenoid valve 44 will be activated by the controller 12 and that to simultaneously input carbon dioxide and high oxygen air into container 10, the controller 12 will activate compressor 16, second solenoid valve 40 and third solenoid valve 44.

Additional modifications and improvements of the present invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:

1. A controlled atmosphere system, comprising:
   a sealed transport container;
   a first inlet line having a first end in fluid communication with ambient air from outside said container and a second end disposed within said container;
   a compressor having an intake port fluidly coupled to the second end of said first inlet line and an exhaust port;
   an exhaust line having first and second ends, said first end fluidly coupled to said exhaust port;
   a gas separation means having an entrance port fluidly coupled to the second end of said exhaust line and having an exit port;
   a first outlet line having a first end fluidly coupled to said exit port and a second end fluidly coupled to said container for placing said exit port into fluid communication with gas inside said container;
   a second outlet line having a first end fluidly coupled to said container for receiving gas samples from within said container and a second end disposed outside of said container;
   a gas analyzing means fluidly coupled to the second end of said second outlet line for determining the oxygen level of gas within said container; and
   a programmable control means electrically interfaced to said compressor, said gas separation means and said gas analyzing means, said control means being programmed to increase the oxygen level of gas inside said container in response to an electrical signal generated by said gas analyzing means indicating that the oxygen level of the gas within the container as determined from the gas samples is below a predetermined oxygen range, and decrease the oxygen level of the gas inside said container in response to an electrical signal generated by the gas analyzing means indicating that the oxygen level within said container as determined from the gas samples is above the predetermined oxygen range;
   said compressor being operable to introduce gas into the container in quantities sufficient to internally pressurize the container.

2. The container of claim 1 wherein said gas analyzing means further determines the carbon dioxide levels of gas within said container and said control means is further operable to:
   increase the carbon dioxide level of the gas inside said container in response to an electrical signal generated by said gas analyzing means indicating that the carbon dioxide level of the gas within said container as determined from the gas samples is below a predetermined carbon dioxide range; and
   decrease the carbon dioxide level of the gas within said container in response to an electrical signal generated by said gas analyzing means indicating that the carbon dioxide level within said container is above the predetermined carbon dioxide range.

3. The container of claim 2 wherein said gas analyzing means comprises an oxygen sensor and a carbon dioxide sensor.

4. The container of claim 3 wherein said control means comprises a microprocessor.

5. The container in claim 4 wherein said oxygen sensor, said carbon dioxide sensor and said microprocessor are disposed within a controller housing, said controller housing further comprising:
   a plurality of function control buttons for programming said microprocessor; and
   a display panel.

6. The container of claim 2 further comprising an ambient air calibration means electrically interfaced to said control means and fluidly coupled to said second outlet line for selectively calibrating said gas analyzing means by passing ambient air therethrough when activated by said control means.

7. The container of claim 2 further comprising a gas calibration means electrically interfaced to said control means and fluidly coupled to said second outlet line for selectively calibrating said gas analyzing means by passing a preselected calibrating gas therethrough when activated by said control means.

8. The container of claim 7 wherein said calibrating gas comprises a known composition of carbon dioxide and nitrogen.

9. The container of claim 7 wherein said calibrating gas comprises five percent (5%) carbon dioxide and ninety-five percent (95%) nitrogen.

10. The container of claim 1 further comprising a heater means fluidly coupled within said exhaust line intermediate the first and second ends thereof for heating ambient air circulated by said compressor to a predetermined temperature.

11. The container of claim 10 further comprising a first filter fluidly coupled within said exhaust line intermediate the first end thereof and said heating means, said first filter being operable to remove moisture from air exhausted by said compressor.

12. The container of claim 11 wherein said first filter includes a sump and drain fluidly coupled thereto for draining water removed from the air by said first filter.

13. The container of claim 2 further comprising a first valve fluidly coupled within said first outlet line intermediate the first and second ends thereof, said first valve being operable to regulate the flow of ambient air through said gas separation means.

14. The container of claim 13 further comprising a bypass channel having a first end fluidly coupled to said first outlet line intermediate said gas separation means and said first valve and said container, thus defining a flow passage from said exit port to said container which excludes said first valve, said bypass channel being electrically interfaced to said control means and selectively actuatable between open and closed positions thereby and operable to increase the flow of ambient air through said gas separation means when actuated to said open position.

15. The container of claim 14 wherein said control means includes means for activating said compressor and actuating said bypass channel to the open position in response to an electrical signal generated by said gas analyzing means indicating that the oxygen level within said container as determined by the gas samples is below the predetermined oxygen range.

16. The container of claim 15 wherein said control means includes a means for activating said compressor and actuating said bypass channel to said closed position in response to an electrical signal generated by said gas analyzing means indicating that the oxygen level within said container as determined from the gas samples is above the predetermined oxygen range.

17. The container of claim 16 wherein said control means includes means for activating said compressor and actuating said bypass channel to said closed position in response to an electrical signal generated by said gas analyzing means indicating that the carbon dioxide level within said container as determined from the gas samples is above the predetermined carbon dioxide range.

18. The container of claim 17 further comprising a carbon dioxide supply means fluidly coupled to said first outlet line intermediate said first valve and said container, said carbon dioxide supply means being electrically interfaced to said control means and actuatable between open and closed positions thereby, and operable to release pure carbon dioxide into the interior of said container when actuated to said open position.

19. The container of claim 1 wherein said compressor is adapted to be oilless and utilizes Teflon rings and piston skirts.

* * * * *